No. 729,468. PATENTED MAY 26, 1903.
E. L. WICK.
ATTACHMENT FOR RAKES.
APPLICATION FILED FEB. 14, 1903.
NO MODEL.

Attest:
M. B. Smith.
M. D. Phillips.

Inventor:
Edwin L. Wick,
By E. B. Whitmore, Atty.

THE NORRIS PETERS CO., PHOTO-LITHO., WASHINGTON, D. C.

No. 729,468. Patented May 26, 1903.

UNITED STATES PATENT OFFICE.

EDWIN L. WICK, OF ROCHESTER, NEW YORK.

ATTACHMENT FOR RAKES.

SPECIFICATION forming part of Letters Patent No. 729,468, dated May 26, 1903.

Application filed February 14, 1903. Serial No. 143,364. (No model.)

*To all whom it may concern:*

Be it known that I, EDWIN L. WICK, of Rochester, in the county of Monroe and State of New York, have invented a new and useful Improvement in Attachments for Rakes, which improvement is fully set forth in the following specification and shown in the accompanying drawings.

My invention is an attachment for rakes, more particularly dooryard and garden rakes, employed for the purpose of clearing the teeth of the rake of leaves, weeds, grass, or other substances or extraneous matter that may adhere to and clog the teeth. This attachment is made light, as of thin metal, and to clear the teeth of the rake needs only to be struck or pushed against the ground or some other convenient body or be pressed by the foot.

The invention is hereinafter fully described, and particularly pointed out in the claims, reference being had to the accompanying drawings, forming a part of this specification.

Figure 1:
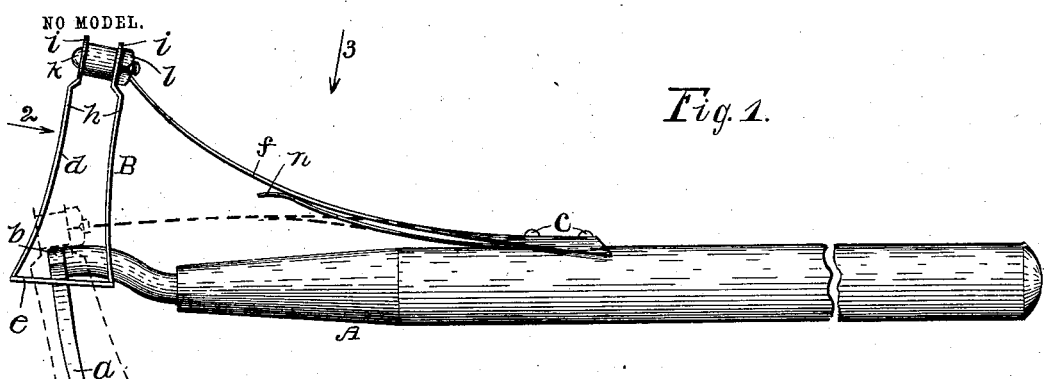
Figure 2:
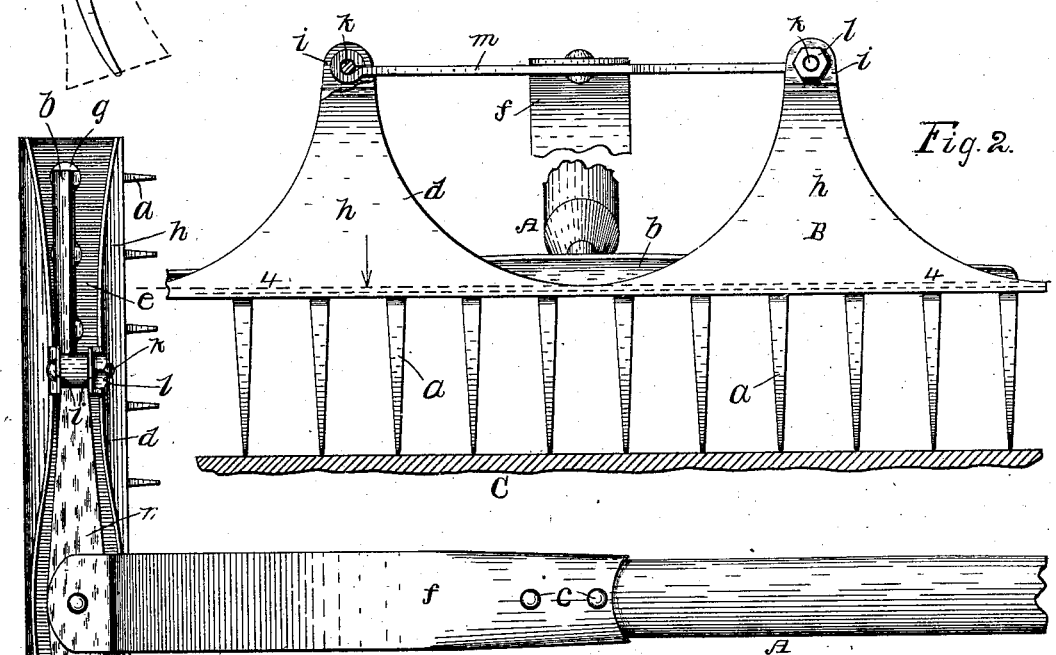
Figures 3, 4, 5:
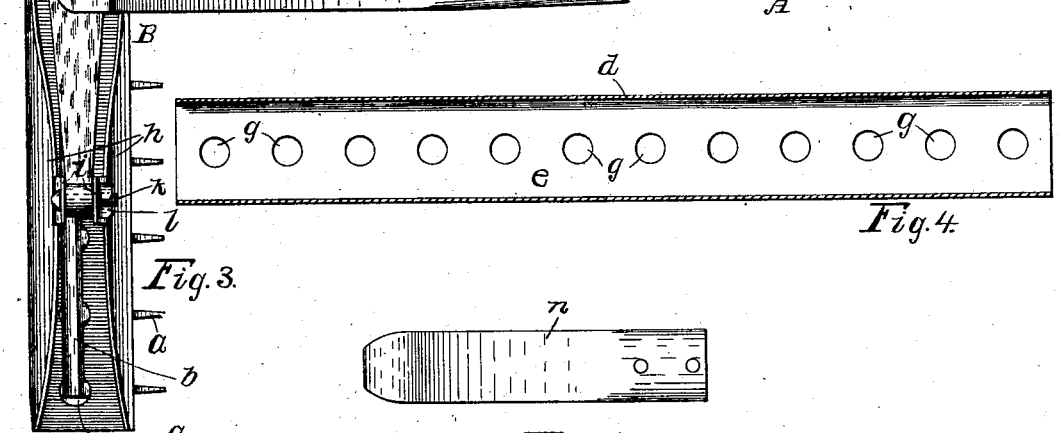

Figure 1 is a side view of the device shown attached to a rake as in use. Fig. 2 is a front end elevation of the parts seen as indicated by arrow 2 in Fig. 1, parts being broken away. Fig. 3 is a plan of the rake and attached parts seen as indicated by arrow 3 in Fig. 1. Fig. 4 is a plan of the perforated operating-plate of the device detached, the section being as on the horizontal dotted line 4 4 in Fig. 2. Fig. 5 is a plan of the auxiliary spring detached.

In the drawings, A is a rake of ordinary construction, having the usual metallic head $b$ and teeth $a$. B is my clearing device or cleaner for the teeth of the rake attached to the stale of the rake, as shown. The device B comprises a sheet-metal hollow body $d$, inclosing the head $b$ of the rake and formed with a perforated plate or floor $e$ to traverse the teeth, said body $d$ being held and controlled by a spring-holder $f$, secured to the stale of the rake by fasteners $c$. The plate $e$ is formed with a series of holes $g$, Figs. 3 and 4, in line to receive through them the respective teeth $a$ of the rake, so that the plate $e$ may move up to the base of the teeth and occupy a position against the head $b$, in which position it is held normally by the spring-holder $f$.

The sides $h\ h$ of the body $d$ extend upward from the respective edges of the plate $e$ and are cut away in curved form, as clearly shown in Fig. 2, for the purpose of giving lightness to the device, these sides terminating in reduced parts $i\ i$, usually offset inwardly, as appears in Figs. 1 and 3. The reduced parts $i\ i$ are opposite, forming pairs, each pair being pierced by a transverse bolt $k$, provided with a tightening-nut $l$. The bolts $k\ k$ hold a horizontal cross-bar $m$, spanning the space between them, at the middle of which bar the upper end of the spring-holder $f$ is secured, the ends of the bar $m$ being bent around the respective bolts $k\ k$, as clearly shown in Fig. 2. The bent ends of the bar surrounding the bolts constitute spacers for the parallel parts $i\ i$, against which ends of the bar the parts $i\ i$ are firmly pressed by the bolts, rendering the body $d$ firm and stiff.

In constructing these attachments for rakes I usually employ auxiliary springs $n$, Figs. 1 and 5, to reinforce the spring-holder $f$, though this is not essential to my invention.

In using the rake when the teeth become fouled it is turned and the upper part of the body $d$ struck on the ground or against some other convenient object. This causes the plate $e$ to traverse the teeth to their points, as indicated by dotted lines in Fig. 1, serving to clear them of all extraneous substances that may adhere to them, or with the points of the teeth resting upon the ground C, as shown in Fig. 2, a pressure of the foot will serve to push the body $d$ downward, causing the teeth to be cleared and cleaned by the perforated plate $e$. The body $d$ being released, the spring $f$ immediately causes it to resume its normal position (shown in Fig. 1) with the plate $e$ against the under surface of the head $b$ of the rake.

What I claim as my invention, and desire to secure by Letters Patent, is—

1. An attachment for rakes, consisting of a body having a perforated part to traverse the teeth of the rake, and sides extending upwardly from said body portion between its ends, means connecting said sides, and longitudinal means joining said connecting means, and means for holding said perforated part normally at the base of the teeth.

2. An attachment for rakes, consisting of a body having a perforated part to traverse the teeth of the rake, and formed with upwardly-extended sides having reduced parts in pairs, bolts through said pairs, and a spanning bar held by the bolts, and means for holding the perforated parts normally against the rake-head.

3. An attachment for rakes, consisting of a sheet-metal body to inclose the head of the rake, and having a perforated plate to traverse the teeth, and upwardly-extending sides, means joining said sides, a bar held by the said means, and a spring-holder for the body, secured at one end to said bar and at the other to the rake.

4. An attachment for rakes, consisting of a body having a perforated part to traverse the teeth of the rake, said body being formed with upwardly-extended sides rising from said perforated part and having lugs offset opposite each other, a bar disposed lengthwise of said body and joined to said offset lugs, and a spring-holder connected at one end to said bar near its mid-length and the other end attached to the stale of the rake.

5. An attachment for rakes, consisting of a perforated part to traverse the teeth of the rake, said body being formed with upwardly-extended sides rising from said perforated part and having lugs offset opposite each other, a bar disposed lengthwise of said body and joined to said offset lugs, a spring-holder connected at one end to said bar near its mid-length and the other end attached to the stale of the rake, and an auxiliary spring disposed beneath said spring-holder to reinforce the same.

In witness whereof I have hereunto set my hand, this 11th day of February, 1903, in the presence of two subscribing witnesses.

EDWIN L. WICK.

Witnesses:
ENOS B. WHITMORE,
MINNIE SMITH.